(12) United States Patent
Thelen et al.

(10) Patent No.: US 6,430,551 B1
(45) Date of Patent: Aug. 6, 2002

(54) VOCABULARY AND/OR LANGUAGE MODEL TRAINING

(75) Inventors: Eric Thelen; Stefan Besling, both of Aachen (DE); Steven DeJarnett, San Jose, CA (US)

(73) Assignee: Koninklijke Philips Electroncis N.V., Eindhoven (NL)

( * ) Notice: Subject to any disclaimer, the term of this patent is extended or adjusted under 35 U.S.C. 154(b) by 0 days.

(21) Appl. No.: 09/167,424

(22) Filed: Oct. 6, 1998

(30) Foreign Application Priority Data

Oct. 8, 1997 (EP) .............................................. 97203124

(51) Int. Cl.[7] .............................................. G06F 17/30
(52) U.S. Cl. .................. 707/3; 707/4; 707/6; 707/515; 704/270.1; 704/251
(58) Field of Search .............................. 707/1, 3, 4, 10; 704/9, 256

(56) References Cited

U.S. PATENT DOCUMENTS

| | | | | |
|---|---|---|---|---|
| 5,278,980 A | * | 1/1994 | Pedersen et al. ................ | 707/4 |
| 5,317,507 A | * | 5/1994 | Gallant ........................ | 707/532 |
| 5,742,807 A | * | 4/1998 | Masinter ........................ | 707/1 |
| 5,857,169 A | * | 1/1999 | Seide ........................... | 704/256 |
| 5,920,856 A | * | 7/1999 | Syeda-Mahmood ............... | 707/3 |
| 5,924,105 A | * | 7/1999 | Punch, III et al. ........... | 707/513 |
| 5,933,822 A | * | 8/1999 | Braden-Harder et al. ...... | 707/5 |
| 5,970,490 A | * | 10/1999 | Morgenstern ................. | 707/10 |
| 6,363,348 B1 | * | 3/2000 | Besling et al. ............. | 704/270.1 |
| 6,067,541 A | * | 5/2000 | Raju et al. ..................... | 707/3 |
| 6,092,045 A | * | 7/2000 | Stubley et al. .............. | 704/254 |

OTHER PUBLICATIONS

L. Raniner, B. H. Juang, "Fundamentals of Speech Recognition", Chapter 8, Large Vocabulary Continuous Speech Recognition, pps. 434–454, Prentice Hall, 1993.

* cited by examiner

*Primary Examiner*—Kim Vu
*Assistant Examiner*—Anh Ly
(74) *Attorney, Agent, or Firm*—Daniel J. Piotrowski

(57) ABSTRACT

A system includes means for creating a vocabulary and/or statistical language model from a textual training corpus. The vocabulary and/or language model are used in a pattern recognition system, such as a speech recognition system or a handwriting recognition system, for recognizing a time-sequential input pattern. The system includes means for determining at least one context identifier and means for deriving at least one search criterion, such as a keyword, from the context identifier. The system further includes means for selecting documents from a set of documents based on the search criterion. Advantageously, an Internet search engine is used for selecting the documents. Means are used for composing the training corpus from the selected documents.

14 Claims, 2 Drawing Sheets

VOCABULARY AND/OR LANGUAGE MODEL TRAINING

BACKGROUND OF THE INVENTION

The invention relates to a method for creating a vocabulary and/or statistical language model from a textual training corpus for subsequent use by a pattern recognition system.

The invention further relates to a system for creating a vocabulary and/or a statistical language model for subsequent use by a pattern recognition system; the system comprising means for creating the vocabulary and/or statistical language model from a textual training corpus.

The invention also relates to a pattern recognition system for recognising a time-sequential input pattern using a vocabulary and/or statistical language model; the pattern recognition system comprising the system for creating a vocabulary and/or statistical language model from a textual training corpus.

Pattern recognition systems, such as large vocabulary continuous speech recognition systems or handwriting recognition systems, typically use a vocabulary to recognise words and a language model to improve the basic recognition result. FIG. 1 illustrates a typical large vocabulary continuous speech recognition system 100 [refer L. Rabiner, B-H. Juang, "Fundamentals of speech recognition", Prentice Hall 1993, pages 434 to 454]. The system 100 comprises a spectral analysis subsystem 110 and a unit matching subsystem 120. In the spectral analysis subsystem 110 the speech input signal (SIS) is spectrally and/or temporally analysed to calculate a representative vector of features (observation vector, OV). Typically, the speech signal is digitised (e.g. sampled at a rate of 6.67 kHz.) and pre-processed, for instance by applying pre-emphasis. Consecutive samples are grouped (blocked) into frames, corresponding to, for instance, 32 msec. of speech signal. Successive frames partially overlap, for instance, 16 msec. Often the Linear Predictive Coding (LPC) spectral analysis method is used to calculate for each frame a representative vector of features (observation vector). The feature vector may, for instance, have 24, 32 or 63 components. In the unit matching subsystem 120, the observation vectors are matched against an inventory of speech recognition units. A speech recognition unit is represented by a sequence of acoustic references. Various forms of speech recognition units may be used. As an example, a whole word or even a group of words may be represented by one speech recognition unit. A word model (WM) provides for each word of a given vocabulary a transcription in a sequence of acoustic references. For systems, wherein a whole word is represented by a speech recognition unit, a direct relationship exists between the word model and the speech recognition unit. Other systems, in particular large vocabulary systems, may use for the speech recognition unit linguistically based sub-word units, such as phones, diphones or syllables, as well as derivative units, such as fenenes and fenones. For such systems, a word model is given by a lexicon 134, describing the sequence of sub-word units relating to a word of the vocabulary, and the sub-word models 132, describing sequences of acoustic references of the involved speech recognition unit. A word model composer 136 composes the word model based on the subword model 132 and the lexicon 134. FIG. 2A illustrates a word model 200 for a system based on whole-word speech recognition units, where the speech recognition unit of the shown word is modelled using a sequence of ten acoustic references (201 to 210). FIG. 2B illustrates a word model 220 for a system based on sub-word units, where the shown word is modelled by a sequence of three sub-word models (250, 260 and 270), each with a sequence of four acoustic references (251, 252, 253, 254; 261 to 264; 271 to 274). The word models shown in FIG. 2 are based on Hidden Markov Models, which are widely used to stochastically model speech and handwriting signals. Using this model, each recognition unit (word model or subword model) is typically characterised by an HMM, whose parameters are estimated from a training set of data. For large vocabulary speech recognition systems involving, for instance, 10,000 to 60,000 words, usually a limited set of, for instance 40, sub-word units is used, since it would require a lot of training data to adequately train an HMM for larger units. A HMM state corresponds to an acoustic reference (for speech recognition) or an allographic reference (for handwriting recognition). Various techniques are known for modelling a reference, including discrete or continuous probability densities.

A word level matching system 130 matches the observation vectors against all sequences of speech recognition units and provides the likelihoods of a match between the vector and a sequence. If sub-word units are used, constraints are placed on the matching by using the lexicon 134 to limit the possible sequence of sub-word units to sequences in the lexicon 134. This reduces the outcome to possible sequences of words. A sentence level matching system 140 uses a language model (LM) to place further constraints on the matching so that the paths investigated are those corresponding to word sequences which are proper sequences as specified by the language model. In this way, the outcome of the unit matching subsystem 120 is a recognised sentence (RS). The language model used in pattern recognition may include syntactical and/or semantical constraints 142 of the language and the recognition task. A language model based on syntactical constraints is usually referred to as a grammar 144.

Similar systems are known for recognising handwriting. The language model used for a handwriting recognition system may in addition to or as an alternative to specifying word sequences specify character sequences.

The grammar 144 used by the language model provides the probability of a word sequence $W=w_1w_2w_3 \ldots w_q$, which in principle is given by:

$$P(W)=P(w_1)P(w_2|w_1) \cdot P(w_3|w_1w_2) \ldots P(w_q|w_1w_2w_3 \ldots w_q).$$

Since in practice it is infeasible to reliably estimate the conditional word probabilities for all words and all sequence lengths in a given language, N-gram word models are widely used. In an N-gram model, the term $P(w_j|w_1w_2w_3 \ldots w_{j-1})$ is approximated by $P(w_j|w_{j-N+1} \ldots w_{j-1})$. In practice, bigrams or trigrams are used. In a trigram, the term $P(w_j|w_1w_2w_3 \ldots W_{j-1})$ is approximated by $P(w_j|w_{j-2}w_{j-1})$.

The invention relates to recognition systems which use a vocabulary and/or a language model which can, preferably automatically, be build from a textual training corpus. A vocabulary can be simply retrieved from a document by collecting all different words in the document. The set of words may be reduced, for instance, to words which occur frequently in the document (in absolute terms or relative terms, like relative to other words in the document, or relative with respect to a frequency of occurrence in default documents).

A way of automatically building an N-gram language model is to estimate the conditional probabilities $P(w_j|w_{j-N+1} \ldots w_{j-1})$ by a simple relative frequency: $F(w_{j-N+1} \ldots w_{j-1}w_j)/F(w_{j-N+1} \ldots W_{j-1})$, in which F is the number of occurrences of the string in its argument in the given textual training corpus. For the estimate to be reliable, $F(w_{j-N+1} \ldots w_{j-1}w_j)$ has to be substantial in the given corpus. One way of achieving this is to use an extremely large training corpus, which covers most relevant word sequences. This is not a practical solution for most systems, since the language model becomes very large (resulting in a slow or degraded recognition and high storage requirements). Another approach is to ensure that the training corpus is representative of many words and word sequences used for a specific recognition task. This can be achieved by manually collecting documents relevant for a specific category of user, such as a radiologist, a surgeon or a legal practitioner. However, such an approach is not possible for recognition systems targeted towards users whose specific interests are not known in advance. Moreover, if a user develops a new interest, a default provided vocabulary and language model will not reflect this, resulting in a degraded recognition result.

SUMMARY OF THE INVENTION

It is an object of the invention to create a vocabulary and/or language model which is better tailored to specific user interests. A further object is to create a vocabulary and/or language model which allows improved or faster recognition.

To achieve the object, the method comprises the steps of determining at least one context identifier; deriving at least one search criterion from the context identifier; selecting documents from a set of documents based on the search criterion; and composing the training corpus from the selected documents. By searching for documents based on a search criterion derived from a context identifier, pertinent documents are collected in an effective way, ensuring that pertinent language elements are covered. This increases the quality of recognition. Moreover, also many irrelevant language elements will not be included, allowing the creation of a relatively small vocabulary or language model. This in turn can lead to a faster recognition or, alternatively, improve the recognition rate by adding more elements, such as acoustic data or allographic data, in other parts of the recognition system.

In an embodiment according to the invention, the context identifier comprises a keyword, which acts as the search criterion. For instance, the (prospective) user of a pattern recognition system specifies one or more keywords, based on which the documents are selected.

In another embodiment according to the invention, the context identifier indicates a sequence of words, such as a phrase or a text. From this sequence of words, one or more keywords are extracted, which act as the search criterion. For instance, the (prospective) user of a pattern recognition system specifies one or more documents representative of his interests. Keywords are extracted from the documents, and additional documents are selected based on the keywords. In this way, the user is relieved from choosing keywords.

In another embodiment according to the invention, the set of documents is formed by a document database or document file system. As an example, a large volume storage system, such as a CD-ROM or DVD, containing a large and diverse set of documents may be supplied with the pattern recognition system, allowing the (prospective) user to select pertinent documents from this set.

In another embodiment according to the invention, the set of documents is formed by documents in a distributed computer system. This allows for centrally storing (e.g. in a server) a larger set of documents than would normally be feasible to store or provide to a client computer on which the pattern recognition system is to be executed. Alternatively, a very large set of documents may be distributed over several servers. A good example of this last situation is Internet. Particularly if a system like Internet is used, many of the selected documents will reflect the language used at that moment, allowing for an upto-date vocabulary and/or language model to be created.

In another embodiment according to the invention, a network search engine, like those commonly used on Internet, is used to identify relevant documents based on the search criteria supplied to the search engine.

In another embodiment according to the invention, a network search agent, which autonomously searches the distributed computer system based on the search criterion, is used to identify relevant documents and, optionally, for retrieving the documents.

In another embodiment according to the invention, the training corpus is updated at a later moment selecting at least one further document from the set of documents and combining the further document with at least one previously selected document to form the training corpus. Particularly, if such updating is based on recent documents (e.g. retrieved via Internet), the language model can be kept up-to-date.

To achieve the object, the pattern recognition system is characterised in that the system comprises: means for determining at least one context identifier; means for deriving at least one search criterion from the context identifier; means for selecting documents from a set of documents based on the search criterion; and means for composing the training corpus from the selected documents. These and other aspects of the invention will be apparent from and elucidated with reference to the embodiments shown in the drawings.

DESCRIPTION OF THE PREFERED EMBODIMENT

Figure 1:
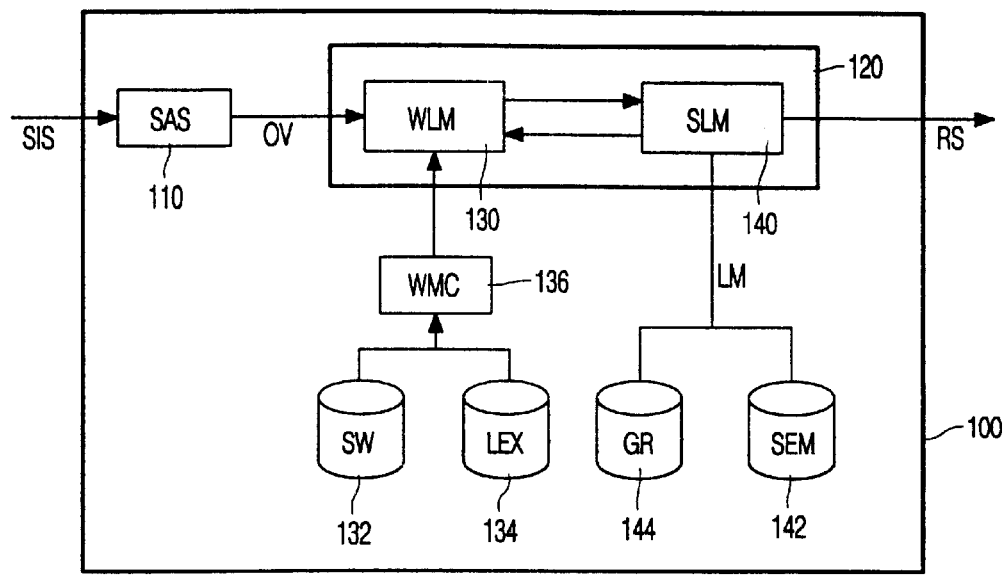
FIG. 1 illustrates a speech recognition system.
Figure 2A:
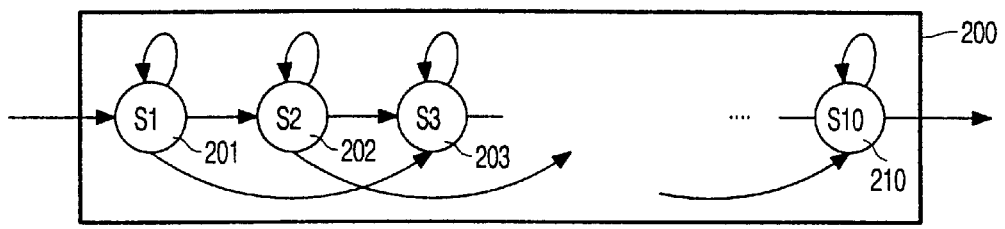
FIG. 2 shows Hidden Markov Models for modelling word or sub-word units.
Figure 2B:
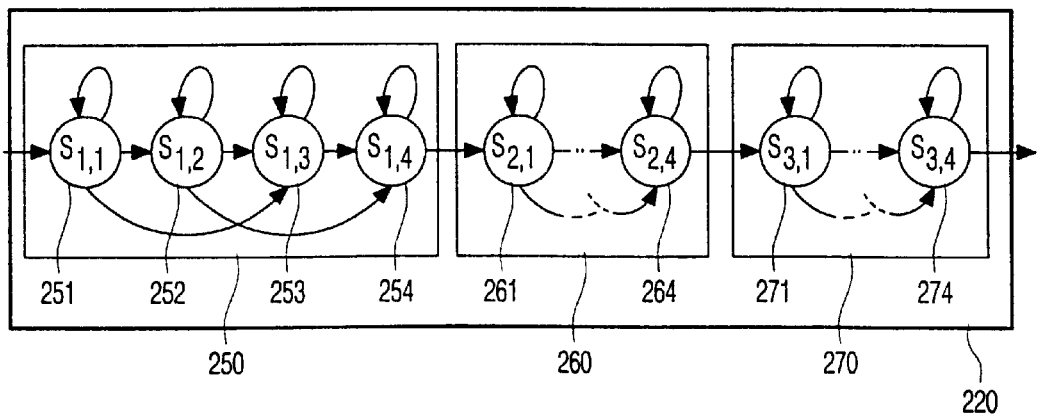
Figure 3:
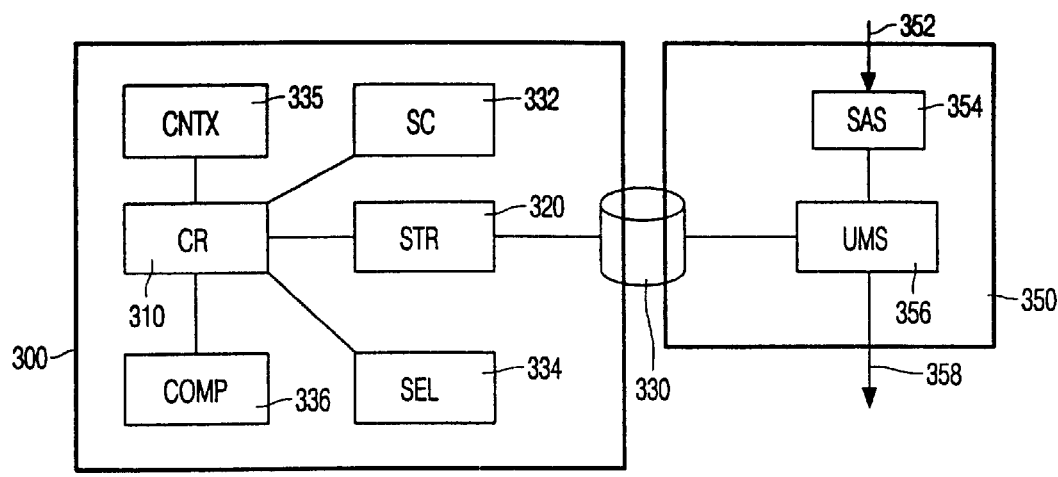
FIG. 3 illustrates a block diagram of the system according to the invention.

FIG. 3 illustrates a block diagram of a system 300 according to the invention. The system comprising means 310 for creating a vocabulary and/or statistical language model from a textual training corpus. The created vocabulary and/or language model is stored using storing means 320. The system will normally be implemented on a computer, such as a PC or a workstation, and operated under control of a suitable program loaded in the processor of the computer. The output of the system (the vocabulary and/or the language model) is supplied to a pattern recognition system, for instance like the one illustrate in FIG. 1. To this end, the information in the storing means 320 may be loaded onto any removable storage medium, such as a CD-ROM, or DVD and reloaded into the pattern recognition system. It will be appreciated that the transfer may also occur via other means, such as a computer network. In such embodiments, the system according to the invention is physically separate from the pattern recognition system. Such an approach may advantageously be used where the system according to the invention is operational at the site of a retailer, which creates the vocabulary and/or language model according to the wishes of a customer system and stores the output into the pattern recognition system acquired by the user. Preferably, the system 300 is combined with the pattern recognition system 350 as shown in FIG. 3, where the vocabulary and/or the language model form the interface 330 between both sub-systems 300 and 350. The pattern recognition system (100, 350) is capable of recognising patterns representing language representative signals created by a person. An example of such signals are speech signals or handwriting signals. In principle, the pattern is a time-sequential pattern, although it will be appreciated that handwriting may also be supplied to the system as an image, wherein a detailed time sequential behaviour, which is present in an on-line handwriting recognition system, is lost. The input signal is analysed using the signal analysing subsystem 354 and recognised by the unit matching subsystem 356, giving as the output 358 a recognition result, for instance in the form of text or control instructions.

According to the invention, the system 300 comprises means 335 for determining at least one context identifier. In a simple form, using conventional user interface means, such as a windowing system with dialogue boxes, a user of the system is requested to supply the context identifier. The system further comprises means 332 means for deriving at least one search criterion from the context identifier. Means 334 are used for selecting documents from a set of documents based on the search criterion. The selection may be performed in any suitable way, for instance by successively opening each of the documents of the set and inspecting the contents of the document to determine whether the document meets the selection criterion. The selection may also be performed by checking descriptive attributes, such as keywords, of a document (if available) against the criterion. Depending on the type of selection process, a document may be selected if one match with the criterion is fulfilled. Alternatively, for instance if the contents of the document is fully scanned, a document is only selected if the level of matching meets a predetermined matching level. The matching level may be an absolute level, such as the criterion has to be matched a predetermined number of times, or a relative level, for instance related to the size of the document. Means 336 are used for composing the training corpus from the selected documents. The composition may simply involve combining all selected documents. In practice, it is preferred to deal with all documents separately, where after an analysis of the document the outcome, in the form of an update to the vocabulary and/or the language model, is maintained but the document itself is no longer of any use to the system. Preferably, the system 300 comes with a default vocabulary and/or language model which is updated using the selected documents.

It will be appreciated that adding a new word to a vocabulary may, in itself, not be sufficient to ensure that the word can be recognised. For a speech recognition system a transcription in acoustic references is additionally required. For many languages, a reasonably accurate transcription can be achieved automatically for most words. By comparing a new word to words already in the vocabulary and having a transcription, a suitable transcription can be created. For instance, with a reasonably high accuracy a phonetic transcription can be made for a word based on phonetic transcriptions of known words. Even if the transcription is of only moderate quality, the new word will be present in the vocabulary and, preferably, also in the language model. This allows recognition of the word (which otherwise would not be possible) and, with the assistance of the language model, the recognition of the word may be of an acceptable level in its context. Once the word has been recognised, the transcription can automatically be adapted to better match the actual utterance for which the word is recognised. Alternatively, the transcription can be improved with the assistance of the user of the speech recognition system in the form of an acoustical training.

In a simple embodiment according to the invention, the context identifier is formed by one or more keywords, which act as the search criterion.

Figure 4:
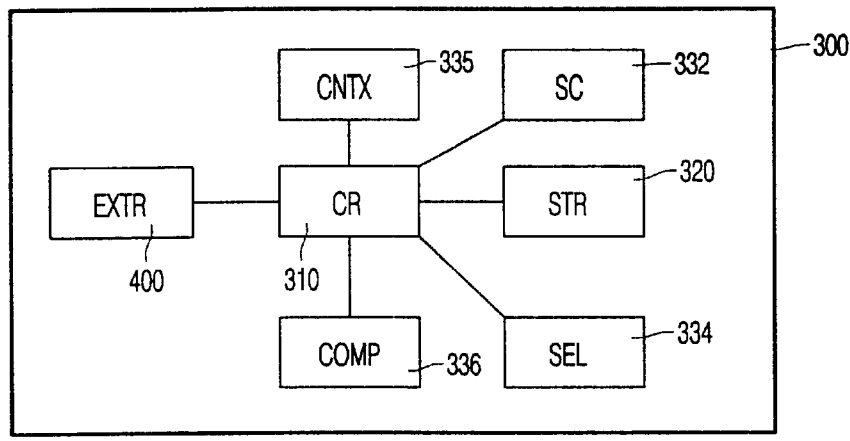
FIG. 4 shows a further embodiment of the system.

In an alternative embodiment, as shown in FIG. 4, the context identifier indicates a sequence of words, such as a phrase or a text. For instance, the user may enter via a user interface a string or indicate a text document. The system 300 comprises means 400 for extracting at least one keyword from the indicated sequence of words. The keywords act as the search criterion. Automatic methods for extracting keywords from a document are known in itself.

The set of documents from which the documents are selected may be formed by a document file system, such as, for instance, used in computer systems. Using conventional documents, the selection can be performed by scanning the contents of the document. Advantageously the set of documents is formed by a document database, such as a document management system. In such a system, as an alternative to or in addition to scanning the contents of the documents, also attributes describing the contents of the documents can be used for the selection.

Figure 5:
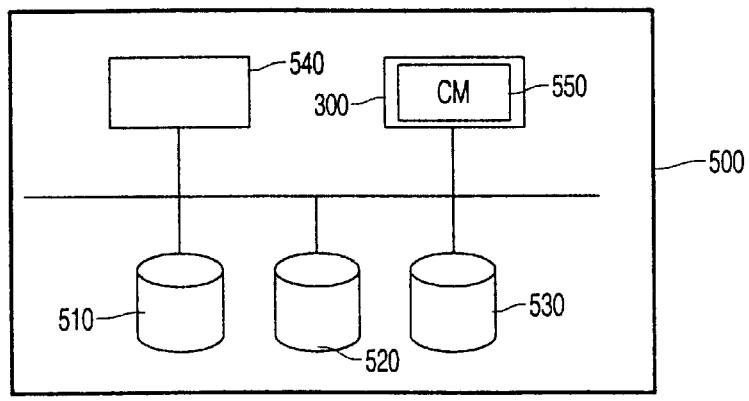
FIG. 5 shows the system operating in a distributed computer system.

In an embodiment according to the invention, as shown in FIG. 5, the set of documents is formed by documents in a distributed computer system 500. The distributed system 500 may range from a group of local computers within one building or site of a company, connected via a local area network, to a world-wide network of computers of different companies, connected via a wide area network, such as Internet. The distributed system 500 comprises several document stores; shown are 510, 520 and 530. In Internet term, the stores are referred to as servers. Also shown is one system 300 according to the invention. It will be appreciated that the distributed computer system 500 may be able to accommodate very many systems like 300.

In a further embodiment according to the invention, the distributed computer system 500 also comprises at least one network search engine 540. The system 300 comprises communication means 550 for supplying the search criterion to the network search engine 540. The network search engine 540 searches the document stores connected to the network 505 for documents meeting the search criterion. Such search engines are well known, particularly for Internet. Typically, the network search engine 540 regularly scans the distributed system 500 to determine which documents are available and to extract attributes, such as keywords, from the documents. The outcome of the scan is stored in a database of the search engine 540. The search is then performed on the database. The communication means 550 is also used for receiving the result of the search back from the search engine 540. Based on the indicated documents, the composition means 336 composes the training corpus. This will usually include using the communication means 550 to acquire the document from the document store indicated by the search engine 540. Alternatively, the search engine 540 may already have supplied the document to the system 300 as a result of the search.

In an alternative embodiment, the system 300 uses a network search agent to search through the stores 510, 520 and 530 of the network 505. To this end, the system 300 provides the search criterion to the search agent. The search agent autonomously searches stores in the network. Whenever a document fulfilling the search criterion is located the agent may deliver this to the system 300, for instance via regular e-mail. Various forms of search agents are known, particularly for Internet. For instance, the agent may be active only in the system 300, where it in turn (or in parallel) accesses stores in the distributed system, which respond to queries of the agent. Alternatively, the agent may move through the distributed system, e.g. by hopping from one server to another, where-the agent becomes active at the server it is 'visiting' at that moment.

In a further embodiment, the system 300 is operative to update the training corpus by at a later moment selecting at least one further document from the set of documents and combining the further document with at least one previously selected document to form the training corpus. Advantageously, a search engine or a search agent is used to select further documents based on the same search criterion as before. Preferably, the search criterion is updated based on documents recently recognised by the pattern recognition system, for instance by extracting keywords from recognised document(s). The updating may take place as a result of a direct instruction of a user. Alternatively, the updating may be autonomous and occur at regular moments.

What is claimed is:

1. A method for establishing a vocabulary model and /or a statistical language model for subsequent use by a pattern recognition system, said method comprising:

receiving at least one context identifier;

deriving at least one search criterion from said at least one context identifier;

selecting a first set of at least one document based on said at least one search criterion;

composing a training corpus from said first set of at least one document;

selecting a second set of at least one document based on said at least one search criterion; and modifying said training corpus to incorporate said second set of at least one document.

2. The method of claim 1, further comprising:

creating a vocabulary model from said training corpus.

3. The method of claim 1, further comprising:

creating a statistical language model from said training corpus.

4. The method of claim 1, further comprising:

modifying a vocabulary model in response to said modification of said training corpus.

5. The method of claim 1, further comprising:

modifying a statistical language model in response to said modification of said training corpus.

6. A system for establishing a language model, said system comprising:

a means for deriving at least one search criterion from said at least one context identifier;

a means for selecting a first set of at least one document based on said at least one search criterion;

a means for composing a training corpus from said first set of at least one document;

a means for selecting a second set of at least one document based on said at least one search criterion; and a means for modifying said training corpus to incorporate said second set of at least one document.

7. The system of claim 6, further comprising:

a means for creating a vocabulary model from said training corpus.

8. The system of claim 6, further comprising:

a means for creating a statistical language model from said training corpus.

9. The system of claim 6, further comprising:

a means for modifying a vocabulary model in response to said modification of said training corpus.

10. The system of claim 6, further comprising:

a means for modifying a statistical language model in response to said modification of said training corpus.

11. In combination, a computer system operable to establish a model, said computer system including a means for receiving at least one context identifier, a means for deriving at least one search criterion from said at least one context identifier, a means for selecting a first set of at least one document based on said at least one search criterion, a means for composing a training corpus from said first set of at least one document, and a means for creating said model from said training corpus; and a pattern recognition system operable to recognize a time-sequential input pattern based on said model.

12. The combination of claim 11, wherein said model is a vocabulary model.

13. The combination of claim 11, wherein said model is a statistical language model.

14. The combination of claim 11, wherein said computer system further includes a means for selecting a second set of at least one document based on said at least one search criterion;

a means for modifying said training corpus to incorporate said second set of at least one document; and a means for modifying said model in response to said modification of said training corpus.

* * * * *